United States Patent
Kolli et al.

(10) Patent No.: US 11,068,400 B2
(45) Date of Patent: Jul. 20, 2021

(54) FAILURE-ATOMIC LOGGING FOR PERSISTENT MEMORY SYSTEMS WITH CACHE-COHERENT FPGAS

(71) Applicant: VMware, Inc., Palo Alto, CA (US)

(72) Inventors: Aasheesh Kolli, Santa Clara, CA (US); Irina Calciu, Palo Alto, CA (US); Jayneel Gandhi, Sunnyvale, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 16/256,571

(22) Filed: Jan. 24, 2019

(65) Prior Publication Data
US 2020/0242036 A1    Jul. 30, 2020

(51) Int. Cl.
*G06F 12/0831* (2016.01)
*G06F 12/109* (2016.01)
*G06F 9/50* (2006.01)
*G06F 11/07* (2006.01)
*G06F 12/0817* (2016.01)

(52) U.S. Cl.
CPC ........ *G06F 12/0831* (2013.01); *G06F 9/5016* (2013.01); *G06F 11/073* (2013.01); *G06F 12/0828* (2013.01); *G06F 12/109* (2013.01)

(58) Field of Classification Search
None
See application file for complete search history.

(56) References Cited

U.S. PATENT DOCUMENTS

| | | | |
|---|---|---|---|
| 5,275,907 A | 1/1994 | Walls | |
| 6,711,653 B1 * | 3/2004 | Quach | G06F 12/0888 711/143 |
| 9,003,131 B1 | 4/2015 | Lunev | |
| 10,445,238 B1 | 10/2019 | Diestelhorst et al. | |
| 2002/0013886 A1 | 1/2002 | Higuchi et al. | |
| 2014/0112339 A1 * | 4/2014 | Safranek | G06F 9/44505 370/389 |
| 2015/0052309 A1 | 2/2015 | Philip et al. | |
| 2016/0246724 A1 * | 8/2016 | Boehm | G06F 12/0804 |
| 2017/0024324 A1 * | 1/2017 | Shu | G06F 12/0246 |
| 2017/0277636 A1 | 9/2017 | Lee et al. | |
| 2019/0004851 A1 * | 1/2019 | Doshi | G06F 9/466 |
| 2020/0042446 A1 * | 2/2020 | Mittal | G06F 12/0817 |
| 2020/0241978 A1 | 7/2020 | Kolli et al. | |
| 2020/0242035 A1 | 7/2020 | Kolli et al. | |

* cited by examiner

*Primary Examiner* — Yaima Rigol
(74) *Attorney, Agent, or Firm* — Patterson + Sheridan, LLP

(57) ABSTRACT

Disclosed is a technique in which an application can record changes it makes to physical memory. In the technique, the application specifies a virtual memory region which is converted to a plurality of cache lines, each of which is monitored for changes by a device connected to a coherence interconnect coupled to the processor caches. The application sends a start signal to start the logging process and an end signal to stop the process. During the logging process, when a change occurs to one of the cache lines, an undo entry corresponding to the change is created and entered into a transaction log residing in persistent memory. The transaction log containing the undo entries makes the set of changes recorded in the transaction log atomic. If a failure occurs, the recorded changes can be undone as if they never occurred.

14 Claims, 12 Drawing Sheets

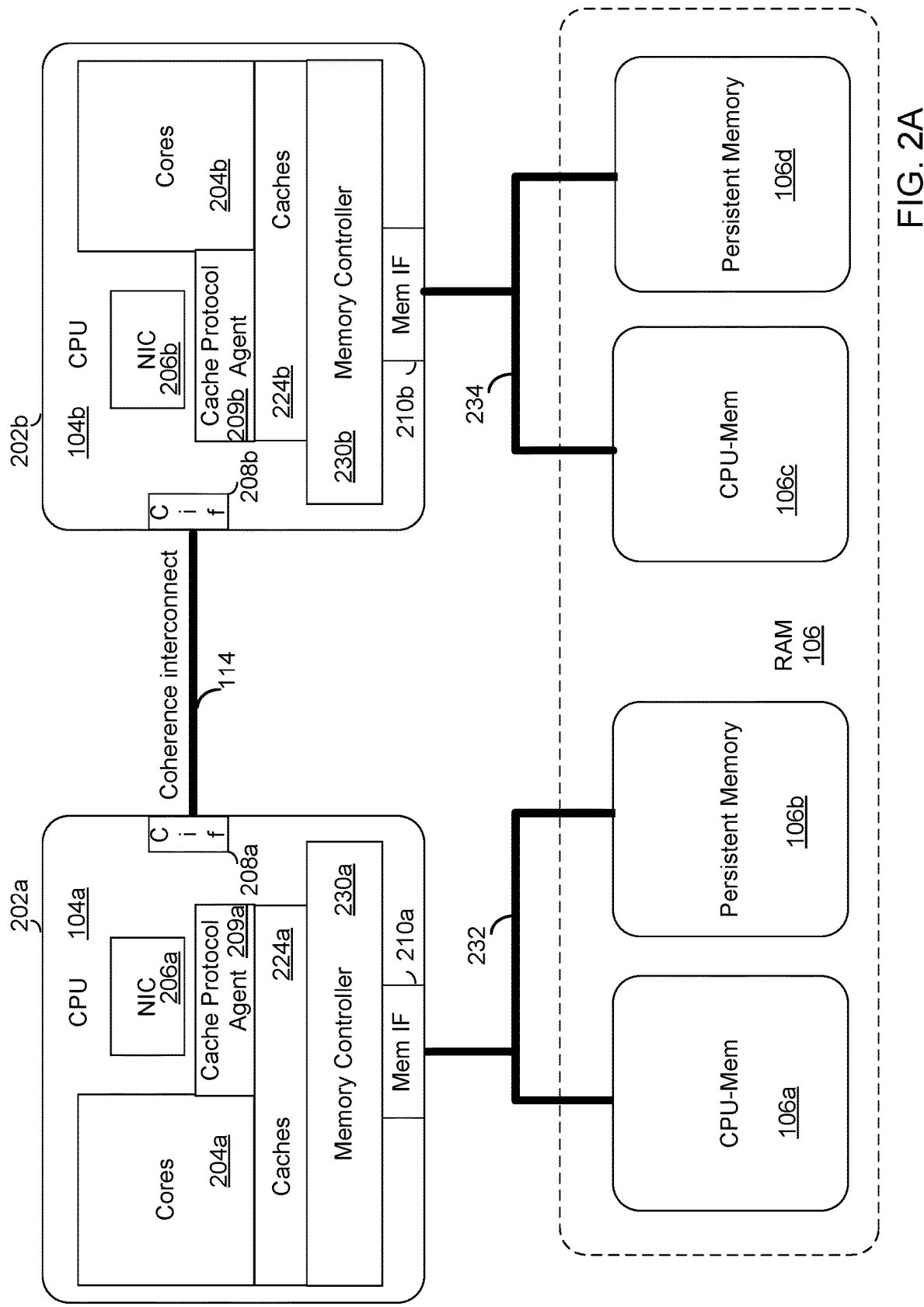

FAILURE-ATOMIC LOGGING FOR PERSISTENT MEMORY SYSTEMS WITH CACHE-COHERENT FPGAS

BACKGROUND

Persistent memory, in the memory/storage hierarchy, resides between system memory and mass storage. Persistent memory is a type of memory that holds its content across power cycles, is byte-addressable, and in some cases has about nine times the density of DRAM. With latencies in the nanosecond range, persistent memory is fast enough to be connected to the memory bus of the CPU as part of main memory so that the CPU can access the data directly rather than perform block I/O operations to buffers for mass storage. It is desirable to make use of the persistence of persistent memory to improve the reliability of applications running in a computing system.

SUMMARY

One embodiment is a method for logging changes to cache lines in a set of cache lines corresponding to one or more physical memory ranges into a log for a transaction, where the log permits recovery from a failure. The method includes receiving a signal to begin logging changes to cache lines in the set of cache lines and in response to the signal to begin the logging, adding a beginning mark for the transaction to the log, where the log resides in a persistent memory, and the beginning mark indicates that the transaction is active. The method further includes, while the transaction is active, tracking each of the cache lines in the set of cache lines, receiving an indication that one cache line of the set of cache lines being tracked has been modified, creating and adding an undo entry corresponding to the modified cache line to the transaction log, and receiving a signal to end the logging. The method further includes, in response to the signal to end the logging, adding an ending mark for the transaction in the transaction log, where the ending mark indicates that the transaction is inactive.

Further embodiments include a device, such as a computer-readable medium for carrying one or more aspects of the above method, and a system configured to carry out one or more aspects of the above method.

Some of the advantages of the embodiments are that: (1) no special write instructions need to be executed by the application to perform the logging; (2) no read-indirection is needed, that is, no access to a new value in a redo log is needed, because only an undo log is used; (3) no stalling is needed prior to every update; and (4) the logging has minimal effect on the caches of the processor in that the entire capacity of the cache is available (i.e., cache lines are not used as log entries) but with a small increase in the cache miss rate due to the use of snooping of the caches.

BRIEF DESCRIPTION OF THE DRAWINGS

FIG. 2A depicts a block diagram of a pair of CPU sockets for CPUs in FIG. 1, in an embodiment.

DETAILED DESCRIPTION

Embodiments described herein provide a facility for an application to selectively mark a set of changes (e.g., data modifications, such as writes to memory) it makes to memory as an atomic transaction. In an atomic transaction, all changes that are part of the transaction persist atomically, meaning either all or none of the changes persist upon a system failure. Having this facility means that if an application fails or discovers an error, the application can undo all the changes of the transaction as if they did not occur. The facility makes the application more robust and lessens the likelihood that an application will lose or corrupt data. In addition, storing the set of changes as a transaction in persistent memory assures that the transaction is preserved over events that require the reloading of traditional volatile memory and even power interruptions.

Figure 1A:
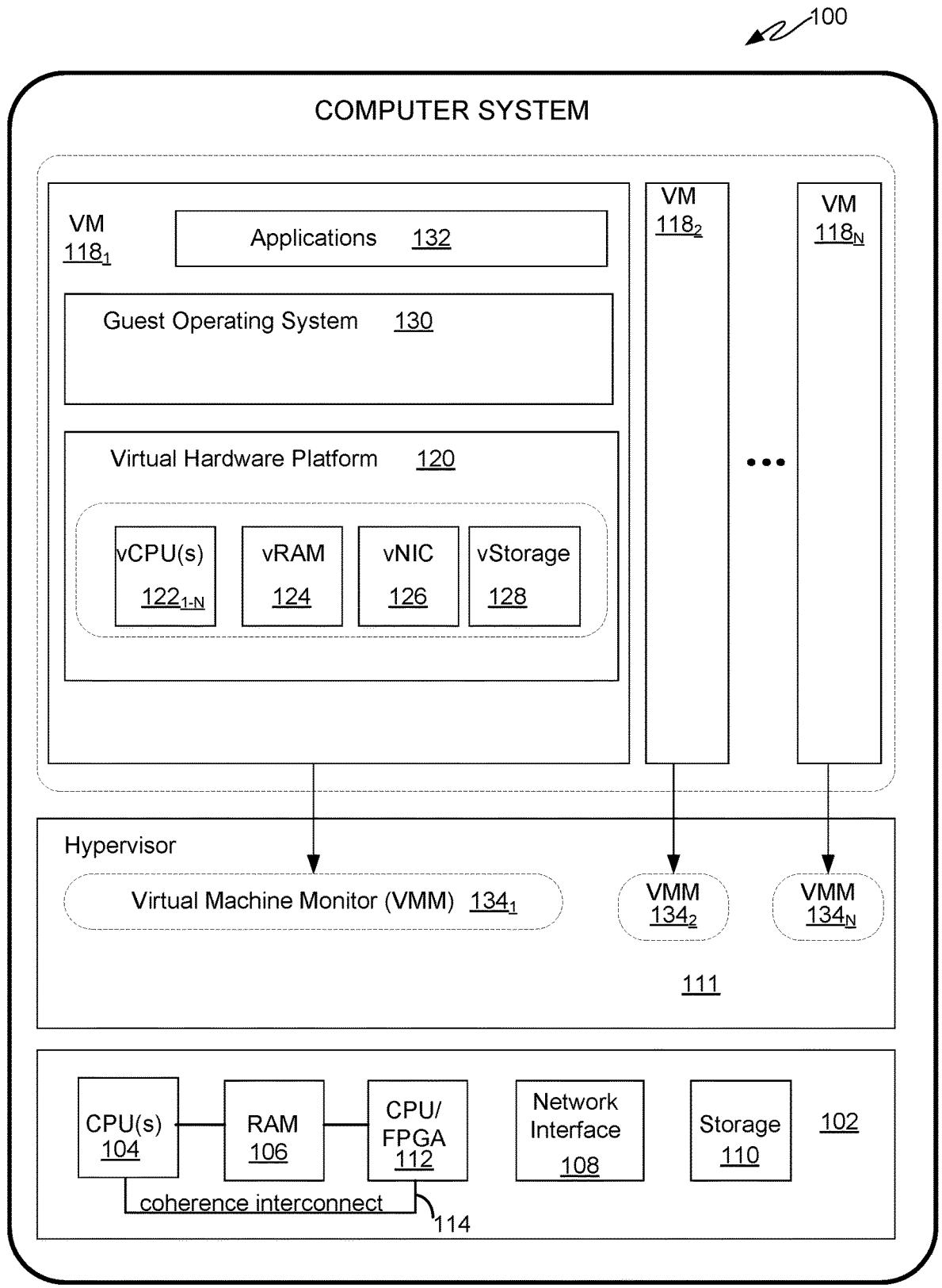
FIG. 1A depicts a block diagram of a computer system that is representative of a virtualized computer architecture in which embodiments may be implemented.

FIG. 1A depicts a block diagram of a computer system 100 that is representative of a virtualized computer architecture in which embodiments may be implemented. As is illustrated, computer system 100 hosts multiple virtual machines (VMs) 118$_1$-118$_N$ that run on and share a common hardware platform 102. Hardware platform 102 includes conventional computer hardware components, such as one or more items of processing hardware such as central processing units (CPUs) 104, 112, a point-to-point coherence interconnect 114 between processors, a random access memory (RAM) 106, one or more network interfaces 108, and persistent storage 110. In an embodiment, the coherence interconnect 114, which supports a cache coherence protocol, is the Intel® UltraPath Interconnect (UPI), which is a successor to the Intel® QuickPath Interconnect (QPI). In the embodiment illustrated herein, another item of processing hardware, a field programmable gate array (FPGA) 112, is installed in one of the CPU sockets and communicates with one or more CPUs 104 via coherence interconnect 114. Though the following discussion has the FPGA occupy a CPU socket, the embodiments are not so limited; any arrangement of the FPGA that includes a connection to the coherence interconnect among processors present in computer system 100 is sufficient.

A virtualization software layer, referred to hereinafter as hypervisor 111, is installed on top of hardware platform 102. Hypervisor 111 makes possible the concurrent instantiation and execution of one or more virtual machines (VMs) $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a virtual computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, and the Linux® operating system, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM includes the hardware emulation components for the virtual machine. In such an alternative conception, for example, the conceptual layer described as virtual hardware platform 120 may be merged with and into VMM 134.

Figure 1B:
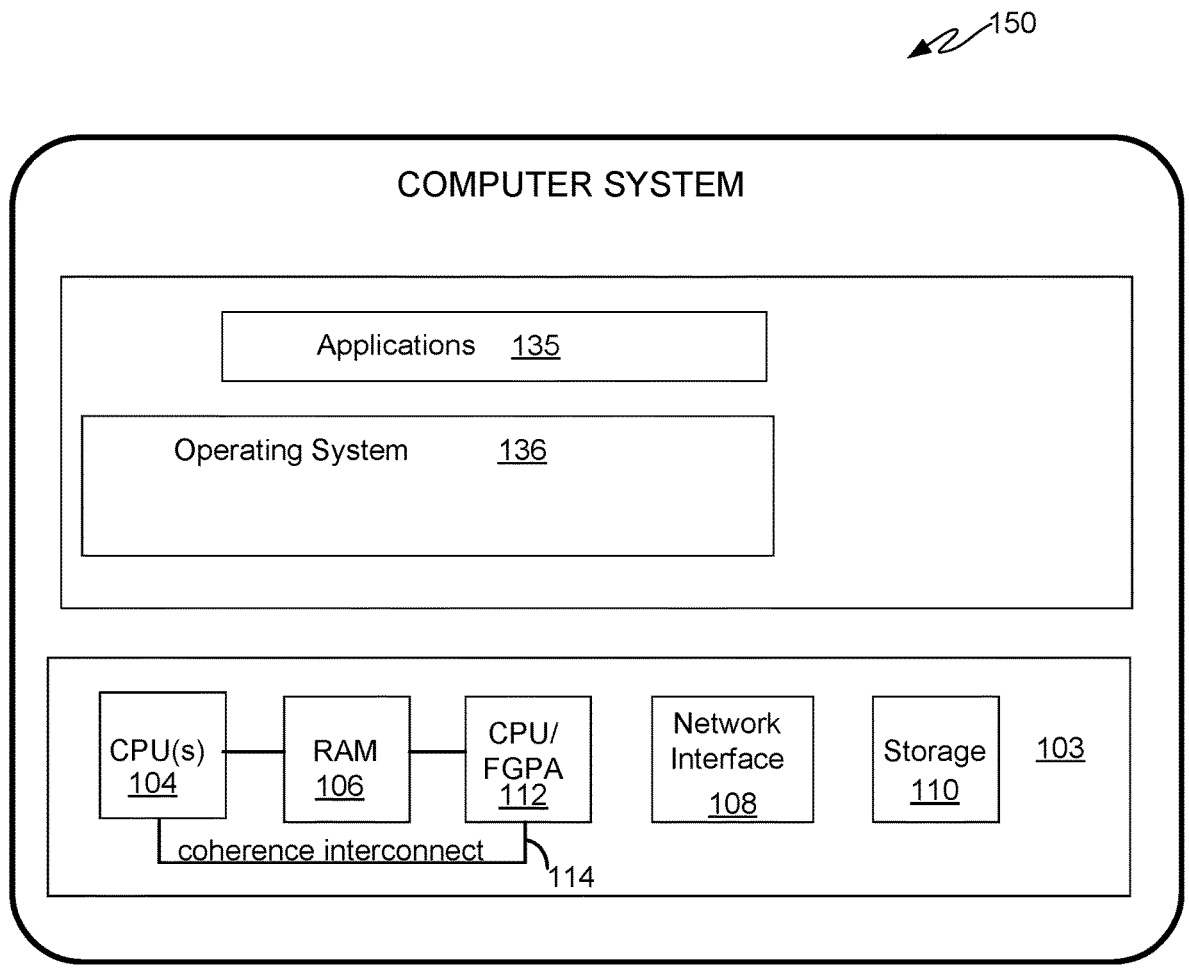
FIG. 1B depicts a block diagram of a computer system that is representative of an alternative computer architecture in which embodiments may be implemented.

FIG. 1B depicts a block diagram of a computer system 150 that is representative of an alternative computer architecture in which embodiments may be implemented. As is illustrated, and similar to hardware platform 102 depicted in FIG. 1A, hardware platform 103 includes conventional computer hardware components, such as one or more items of processing hardware such as central processing units (CPUs) 104, 112, a point-to-point coherence interconnect 114 between processors, which supports a cache coherence protocol, a random access memory (RAM) 106, one or more network interfaces 108, and persistent storage 110. In the embodiment illustrated herein, another item of processing hardware, a field programmable gate array (FPGA) 112, is installed in one of the CPU sockets and communicates with one or more CPUs 104 via coherence interconnect 114. Though the following discussion has the FPGA 112 occupy a CPU socket, the embodiments are not so limited; any arrangement of FPGA 112 that includes a connection to coherence interconnect 114 among processors present in computer system 100 is sufficient.

Hardware platform 103 supports the installation of an operating system (OS) 136, which is capable of executing applications 135. Examples of OS 136 include any of the well-known commodity operating systems, such as the Microsoft Windows® operating system, and the Linux® operating system, and the like.

FIG. 2A depicts a block diagram of a pair of CPU sockets, a first socket 202a for CPU 104a and a second socket 202b for CPU 104b. CPU 104a includes one or more processing cores 204a, a memory controller 230a, an interface 210a to CPU-Mem 106a, persistent memory 106b, both accessible via memory bus 232, a network interface controller (MC) 206a, and a communications interface (cif) port 208a connected to coherence interconnect 114. Similarly, CPU 104b includes one or more processing cores 204b, a memory controller 230b, an interface 210b to CPU-Mem 106c, persistent memory 106d via memory bus 234, a network interface controller (MC) 206b, and a communications interface (cif) port 208b connected to coherence interconnect 114.

In one embodiment, CPU 104a has one or more caches 224a, and CPU 104b has one or more caches 224b, which are used to reduce the average cost to access data from memory. Memory controller 230a, 230b transfers cache lines between CPU-Mem 106a and persistent memory 106b and respective caches 224a, 224b where a cache line (sometimes called a cache block) generally refers to a block of data of fixed size that is transferred between a memory location and a cache. When memory controller 230a, 230b copies a cache line from CPU-Mem 106a, CPU-Mem 106c or persistent memory 106b, 106d respectively into caches 224a, 224b, a cache entry is created, which may include the copied data as well as the memory location from which the data was copied (which may be called a tag). When CPU 104a, 104b needs to read or write a location in CPU-Mem 106a, 106c, persistent memory 106b, 106d, it first checks for a corresponding entry in respective caches 224a, 224b. Caches 224a, 224b check for the contents of the requested memory location in any cache lines that might contain that address. If CPU 104a, 104b finds that the memory location is in caches 224a, 224b, a cache hit has occurred; CPU 104a, 104b immediately reads or writes the data in the cache line. However, if CPU 104a, 104b does not find the memory location in caches 224a 224b, a cache miss has occurred. For a cache miss, caches 224a, 224b allocate a new entry and respective memory controller 230a, 230b copies data from CPU-Mem 106a, 106c, persistent memory 106b, 106d. CPU 104a, 104b then accesses the requested memory location respectively from the contents of caches 224a, 224b.

Figure 2B:
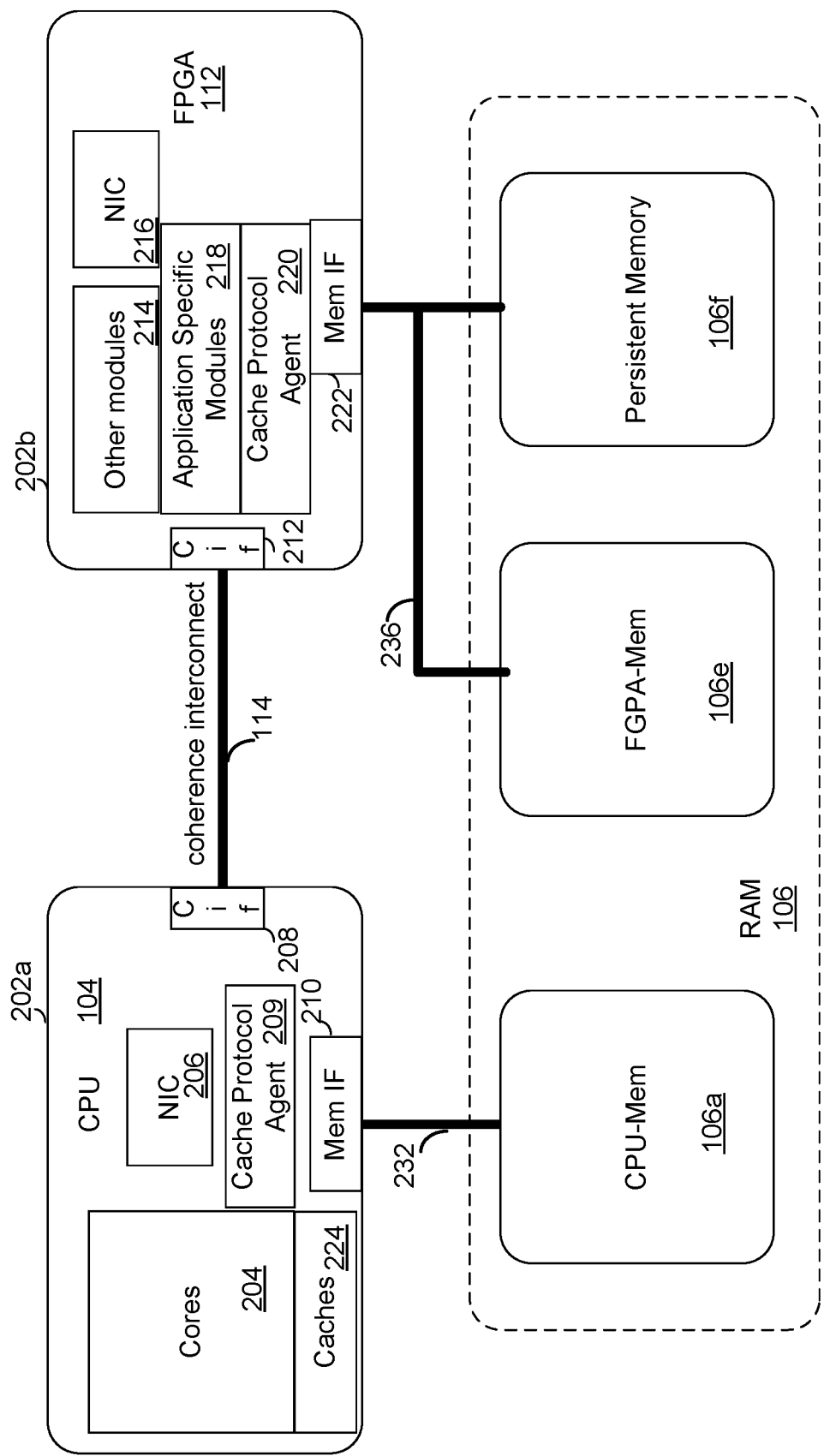
FIG. 2B depicts a block diagram of a pair of CPU sockets, a first socket for a CPU and a second socket for an FPGA, in an embodiment.

FIG. 2B depicts a block diagram of a pair of CPU sockets, a first socket 202a for CPU 104 and a second socket 202b for FPGA 112. CPU 104 includes one or more processing cores 204, an interface 210 to CPU-Mem 106a accessible by CPU 104 via memory bus 232, a network interface controller (NIC) 206, and a communications interface (cif) port 208 connected to coherence interconnect 114. FPGA 112 is configured with a network interface controller (MC) 216, one or more application-specific modules 218, a cif port 212 and a cache protocol agent 220. Application specific modules 218 are configured by a bitstream representing custom programming of FPGA 112. Other modules 214 whose operations are unrelated to application-specific modules 218 may be present in FPGA 112, these modules and components being configured by a bitstream different from the custom programming bitstream. FPGA 112 has an interface 222 to FPGA-Mem 106e and persistent memory 106f via memory bus 236. In one embodiment, each CPU socket, 202a, 202b, represents a separate Non-Uniform Memory Access (NUMA) domain. The application or the VIVI is running on CPU 104, located on first socket 202a, while FPGA 112 is located on second socket 202b.

In one embodiment, CPU 104 has one or more caches 224, which are used to reduce the average cost to access data from memory. Data is transferred between CPU-Mem 106*a* and caches 224 in blocks of fixed size, called cache lines or cache blocks. When a cache line is copied from CPU-Mem 106*a* into caches 224, a cache entry is created, which includes both the copied data and the requested memory location (called a tag). When CPU 104 requests to read or write a location in CPU-Mem 106*a*, caches 224 first check for a corresponding entry contained therein. That is, caches 224 search for the contents of the requested memory location in any cache lines that might contain that address. If CPU 104 finds that the memory location resides in caches 224, a cache hit has occurred, and CPU 104 immediately reads or writes the data in the cache line. However, if CPU 104 does not find the memory location in caches 224, a cache miss has occurred. For a cache miss, caches 224 allocate a new entry and copy data from CPU-Mem 106*a*. The request is then fulfilled from the contents of caches 224. Operation of caches 224*a* and 224*b* is similar to that described for caches 224.

Cif ports 208, 212, mentioned above, support a coherence protocol, which is designed to maintain cache coherence in a system with many processors each having its own cache or caches. With FPGA 112 residing in one socket 202*b* of CPU sockets and having its own cif port 212, FPGA 112 can monitor and participate in the coherency protocol that keeps the processors' caches coherent.

Cache coherence on coherence interconnect 114 is maintained according to a standard coherence protocol, such as modified, exclusive, shared, invalid (MESI) protocol or modified, exclusive, shared, invalid, forwarded (MESIF) protocol. In these protocols, cache lines marked invalid signify that the cache line has invalid data and fresh data must be brought into caches 224 from CPU-Mem 106*a*. Cache lines marked exclusive, shared, and forwarded (in the MESIF protocol) all signify that the cache line has valid data, but the cache line is clean (not modified), so the cache line can be discarded from the cache without writing data of the cache line back to CPU-Mem 106*a*. A cache line marked as modified signifies the cache line is modified or dirty, and data of the cache line must be written back to CPU-Mem 106*a* before the cache line is discarded from caches 224.

The cache coherence protocol is enforced by a cache protocol agent for each cache connected to a coherence interconnect. Each cache protocol agent can initiate and respond to transactions on coherence interconnect 114 by sending and receiving messages on interconnect 114. In the present embodiments, CPU 104 includes a cache protocol agent 209 and FPGA 112 includes a cache protocol agent 220. Cache protocol agent 209 cooperates with cache protocol agent 220 by sending messages, including broadcast messages, over coherence interconnect 114. In the protocol, one of the cache protocol agents among the several agents present is an owner of a set of cache lines and contains information regarding those cache lines. The other cache protocol agents send messages to the owner agent requesting a cache line or to find the status of cache line owned by the owner agent. The owner agent may service the request directly or request that another cache protocol agent satisfy the request.

When a CPU 104 accesses a cache line that is not in its caches 224, at any level of the cache hierarchy, it is cache protocol agent 209 of CPU 104 that requests the cache line from CPU-Mem 106*a*. Thus, cache protocol agent 209 in CPU 104 issues a load cache line transaction on coherence interconnect 114. The transaction can be 'Load Shared' for sharing the cache line or 'Load Exclusive' for cache lines that will be modified. A cache line that is loaded as 'Shared' means that the line probably will not be modified. In contrast, a cache line that is loaded as 'Exclusive' is considered potentially dirty, because it is not certain the cache line will be modified. When a cache line gets evicted from caches 224 to CPU-Mem 106*a*, if it is modified, it must be written back to CPU-Mem 106*a* from which it originated. The operation of writing the cache line is performed on coherence interconnect 114 as a write-back transaction and can be monitored for tracking dirty cache lines. In the case of a write-back transaction, the cache line is actually dirty, rather than potentially dirty. In the description that follows, a write-back transaction is converted to and handled as a message, 'WB Data CL', which is received by write-back module 314.

To confirm whether a cache line is dirty or not, a cache protocol agent, such as agent 220 in FPGA 112, can snoop the cache line in accordance with the coherence interconnect protocol. If agent 220 determines the cache line is dirty, the snoop triggers a write-back transaction, thereby exposing the dirty cache line that was residing in a cache. Cache protocol agents 209 and 220 also have information regarding the cache lines that are resident in the processors' caches. This information is accessible via coherence interconnect 114. Operation of the coherence protocol and cache protocol agents 209*a*, 209*b* for caches 224*a* and 224*b* is similar to that described for caches 224.

Figure 3:
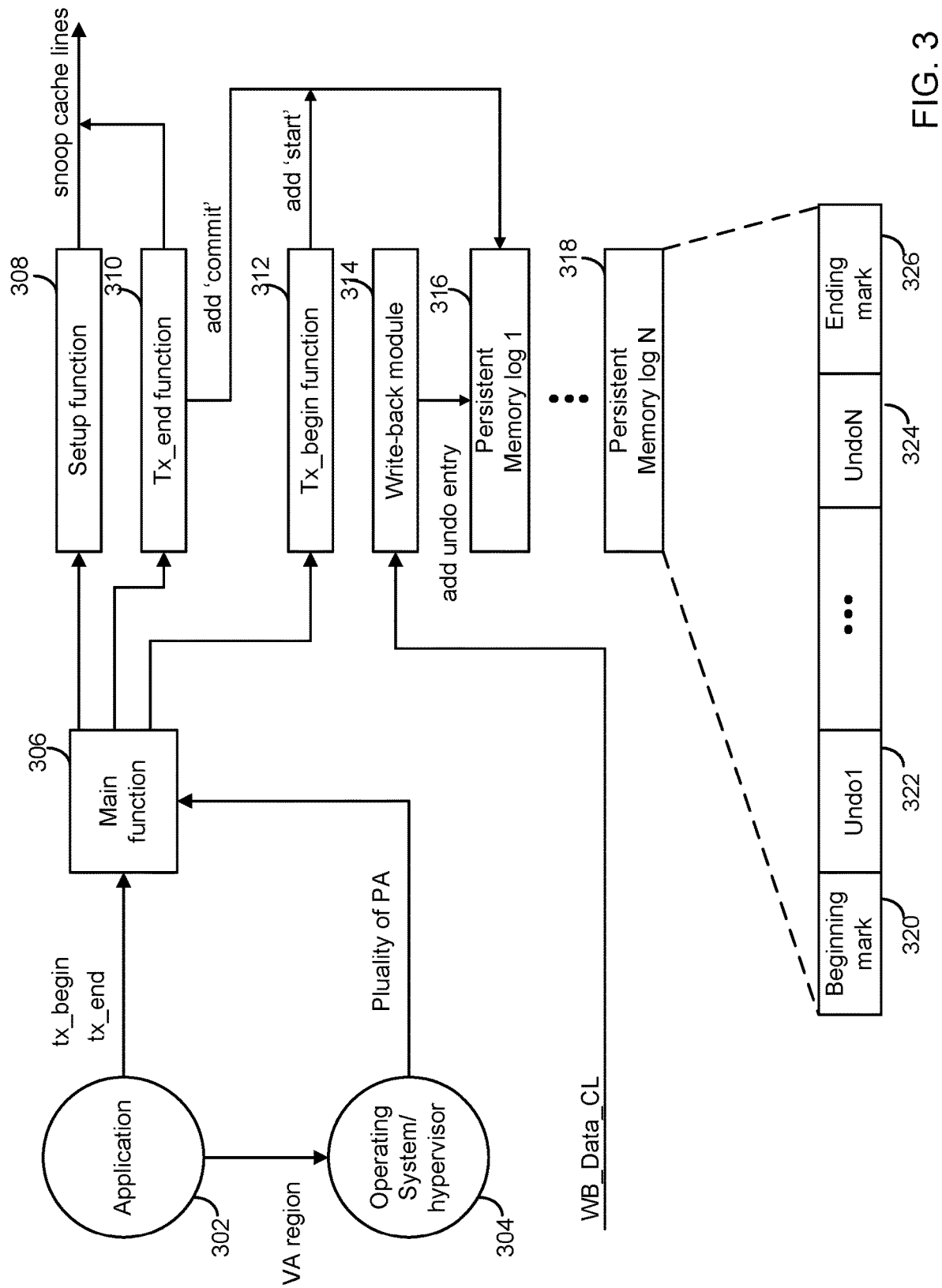
FIG. 3 depicts a diagram of the modules and functions in an embodiment.

FIG. 3 depicts a diagram of the modules and functions for tracking and logging activity of an application, in an embodiment. FIG. 3 includes an application 302, an operating system/hypervisor 304 such as OS 136 in FIG. 1B and hypervisor 111 in FIG. 1A, a main function 306, a setup function 308, a tx_begin function 312, a write-back module 314, and a tx_end function 310. Main function 306 is further described in reference to FIG. 6; setup function 308 is further described in reference to FIG. 7; tx_begin function 312 is further described in reference to FIG. 8; write-back module 314 is further described in reference to FIG. 9; and tx_end function is further described in reference to FIG. 10. Modules and functions communicate with each other by sending and receiving messages without being involved in the underlying communications media. In particular, a step 'Send(msg to dest)' is an asynchronous non-blocking transmission of a message, msg, to a destination, dest, and a step, 'Received(msg)' is a predicate, which if true is interpreted as signaling that a message has been received. If the predicate is false, no message has been received, and the function or module is blocked waiting for a message to arrive. However, the function or module can configure the predicate so that by testing the predicate, the function or module can avoid being blocked. Embodiments described herein are not limited by any specific form or method of receiving messages. Any kind of messaging technique can be used in which messages are sent and received in structures such as shared memory locations, FIFOs or mailboxes.

Also depicted in FIG. 3 are a plurality of persistent memory logs 316 to 318, one for each transaction when there are multiple concurrent transactions being tracked. Each transaction log may be identified by a transaction id, tx id. Each transaction log 316-318 resides in persistent memory 106*b*, 106*d*, 106*f* and in one embodiment, has a beginning mark 320, a sequence of undo entries 322-324 and an ending mark 326 following the sequence of undo entries 322-324. In addition, portions of application 302 being concurrently tracked in multiple transaction logs are selected such that they do not conflict with each other due to locks or other synchronization mechanisms among the portions being tracked. That is, the selection assures that any particular undo entry is recorded in only one of the transaction logs 316, 318.

Figure 4:
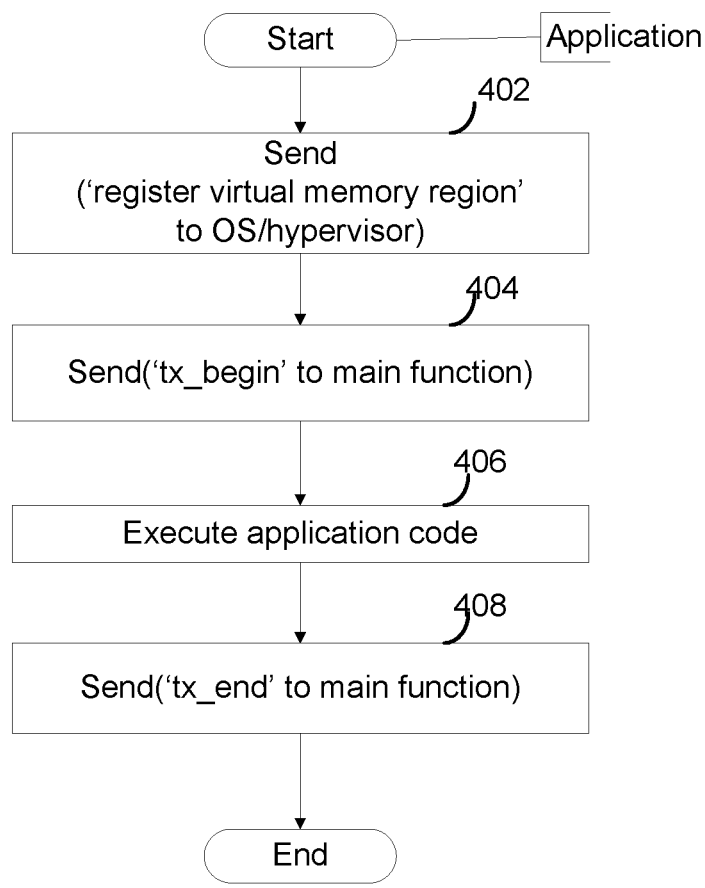
FIG. 4 depicts a flowchart of operations of an application whose activity is to be tracked, in an embodiment.

FIG. 4 depicts a flowchart of operations performed by an application whose activity is to be tracked and logged, in an embodiment. In step 402, application 302 sends a message 'register virtual memory region' to operating system/hypervisor 304. This message identifies a virtual memory region to be tracked for a transaction. In some embodiments, multiple virtual memory regions can be tracked for a transaction. Once the virtual memory region is established, then in step 404, application 302 sends a 'tx_begin' message to main function 306 to signal the start of the identified transaction during which activity of application 302 is to be tracked and logged. In step 406, application 302 executes its application code while the tracking and logging operation is active. In step 408, application 302 sends a 'tx_end' message to main function 306 to stop the tracking and logging. Thus, application 302 controls the virtual memory region that is tracked and possibly logged while it executes its application code. In some embodiments, when application 302 sends a 'register virtual memory region', 'tx_begin', or 'tx_end' message, it includes a transaction id (tx_id) to specify a particular transaction log if multiple transactions are concurrently active. In other embodiments, application 302 requests and obtains a transaction id from main function 306 for one of the transactions that is active, so that it can send a 'tx_end' message with the tx_id specifying which transaction to end.

Figure 5:
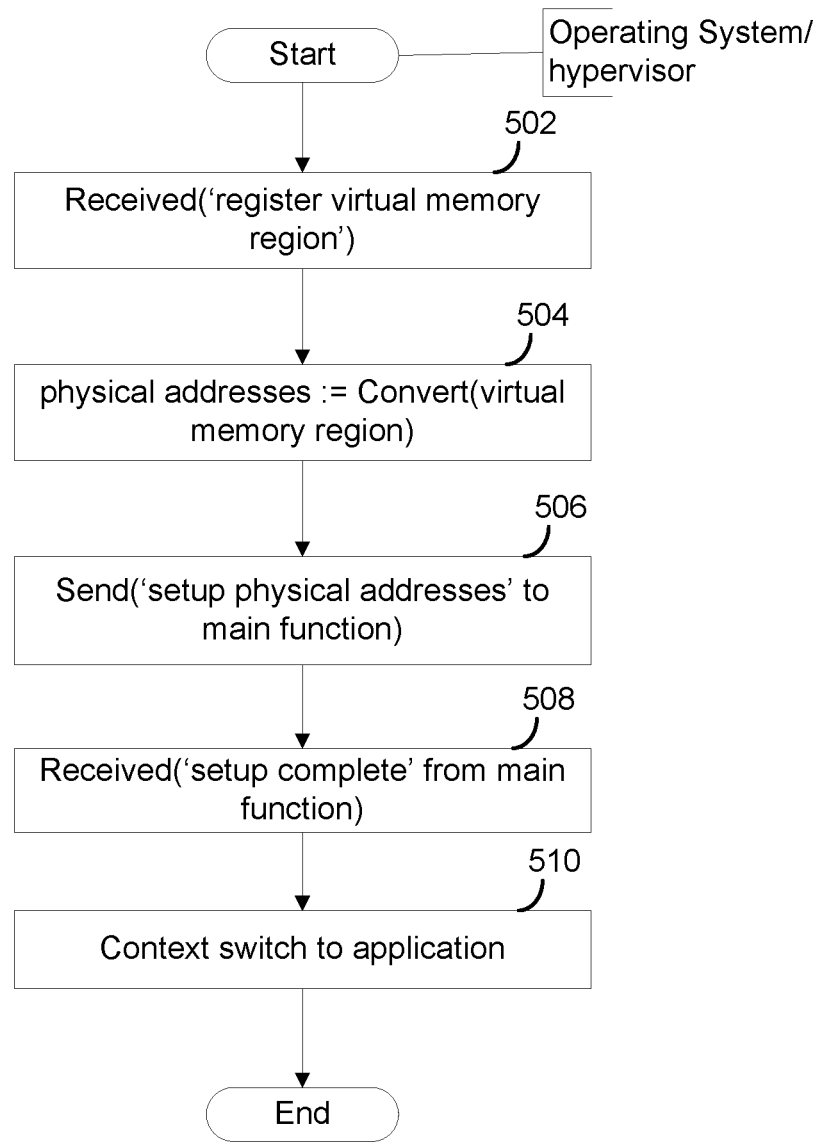
FIG. 5 depicts a flowchart of operations of an operating system or hypervisor supporting the application, in an embodiment.

FIG. 5 depicts a flowchart of operations performed by an operating system/hypervisor for tracking and logging activity of an application, in an embodiment. In step 502, a message 'register virtual memory region' is received by operating system/hypervisor 304 from application 302. In step 504, operating system/hypervisor 304 converts the received virtual memory region into a plurality of physical addresses (PA) and in step 506, sends a 'setup physical addresses' message, which includes the physical addresses, to main function 306. In step 508, operating system/hypervisor 304 receives a message 'setup complete' from main function 306 indicating that the setup is complete. Once the setup is complete, then in step 510, operating system/hypervisor 304 performs a context switch to hand control back to application 302 so that application 302 can begin a transaction. In some embodiments, the 'register virtual memory region' and 'setup physical addresses' messages include a transaction id, tx_id, which identifies one of the transactions when multiple concurrent transactions are active.

Figure 6:
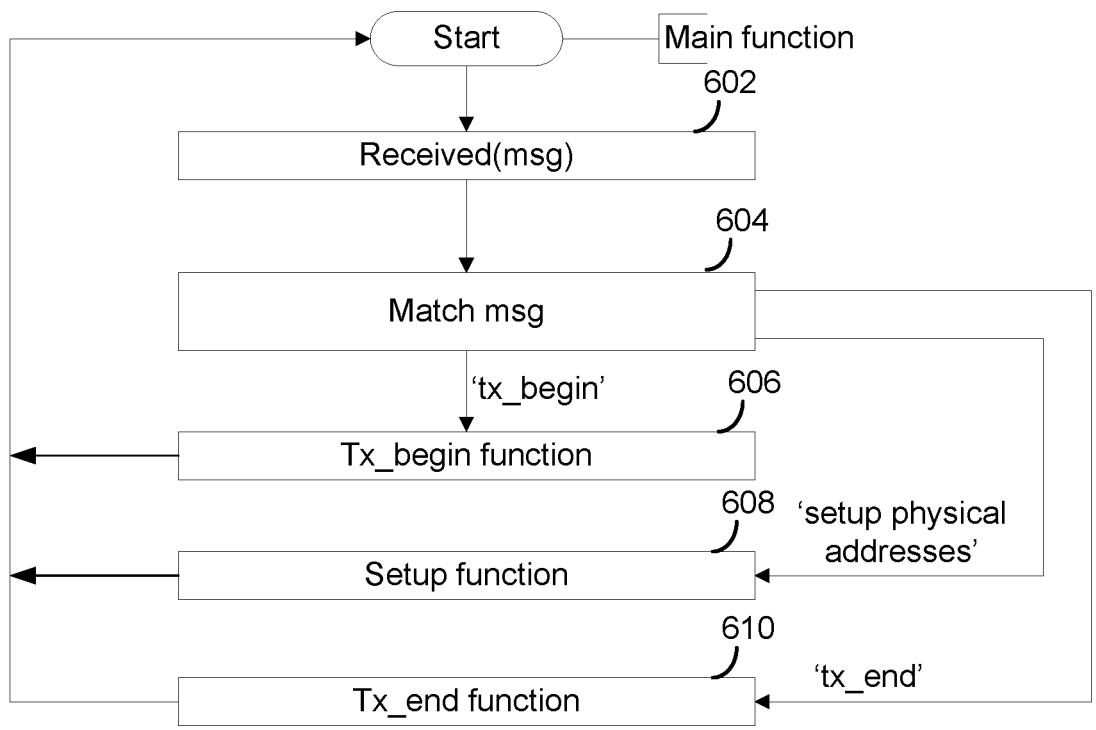
FIG. 6 depicts a flowchart of operations of the main function in an embodiment.

FIG. 6 depicts a flowchart of operations performed by a main function for tracking and logging activity of an application, in an embodiment. In step 602, main function 306 receives a message and in step 604 matches it to one of three possible messages, a 'tx_begin', a 'tx_end', or a 'setup physical addresses'. If the message is a 'tx_begin' message, then in step 606, main function 306 calls tx_begin function 312. If the message is a 'setup physical addresses' message, then in step 608, main function 306 calls setup function 308 with a plurality of physical addresses included in the call, and if the message is a 'tx_end' message, then in step 610, main function 306 calls tx_end function 310. In one embodiment, these messages also include a tx_id to identify the transaction to which the message pertains among multiple transactions that might be active. In an embodiment, main function 306 is included in application-specific modules 218 in FPGA 112. In another embodiment, main function 306 is included in memory controller 230a, 230b.

Figure 7:
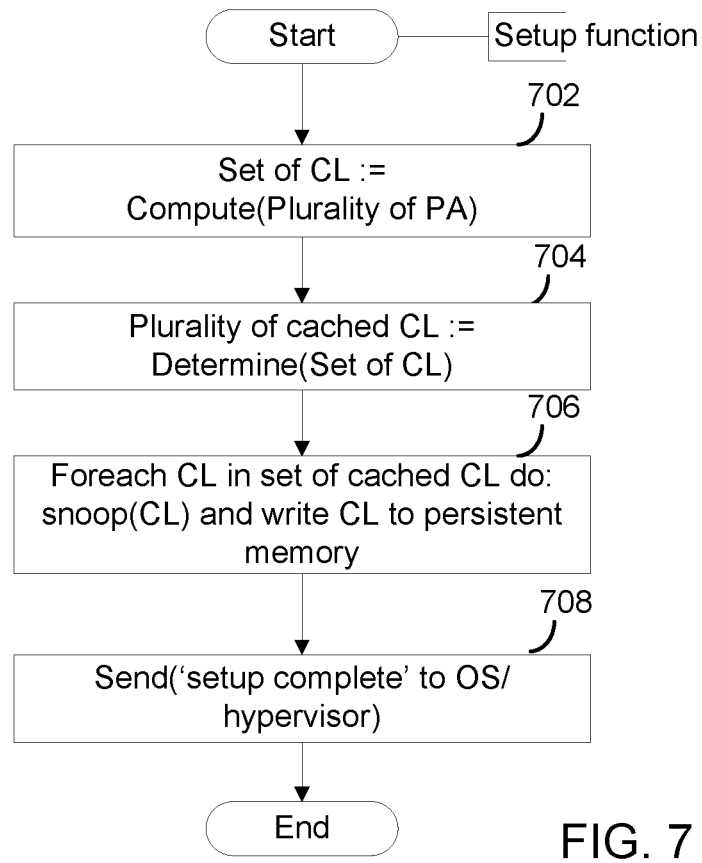
FIG. 7 depicts a flowchart of operations of the setup function, in an embodiment.

FIG. 7 depicts a flowchart of operations performed by a setup function for tracking and logging activity of an application, in an embodiment. Setup function 308 receives a call to perform a setup operation for a transaction. The call includes a plurality of physical addresses (PA). In step 702, setup function 308 computes a set of cache lines from the plurality of physical addresses received in the call. In one embodiment, setup function 308 computes the set of cache lines by determining each address range described by the plurality of physical addresses and then for each range adding an entry into the set of cache lines for each cache line in the range. For example, an address range of 4096 bytes with a cache line size of 64 bytes, requires adding 256 entries to the set of cache lines, where each entry in the set of cache lines includes upper bits of the physical address, such as the cache tag, to identify the cache line. In step 704, setup function 308 determines the set of cache lines that are currently in the processors' caches by querying cache protocol agent 220 of FPGA 112. In step 706, setup function 308 snoops, via coherence interconnect 114, from the processors' caches, each cache line in the set of cache lines residing in the processors' caches and writes the snooped CL back to persistent memory 106b, 106d, 106f. The snooping exposes each cache line residing in the caches and whose changes application 302 is interested in logging. Snooping operations are performed by cache protocol agent 220 in FPGA 112 using the snoop protocol supported by coherence interconnect 114. In step 708, setup function 308 sends a 'setup complete' message to operating system/hypervisor 304. The message informs operating system/hypervisor 304 that the setup is complete so that operating system/hypervisor 304 can hand control back to application 302. In some embodiments, the 'setup complete' message includes a transaction id identifying the transaction, each setup operation thus corresponding to a new transaction. In an embodiment, setup function 308 is included in application-specific modules 218 in FPGA 112. In another embodiment, setup function 308 is included in memory controller 230a, 230b.

Figure 8:
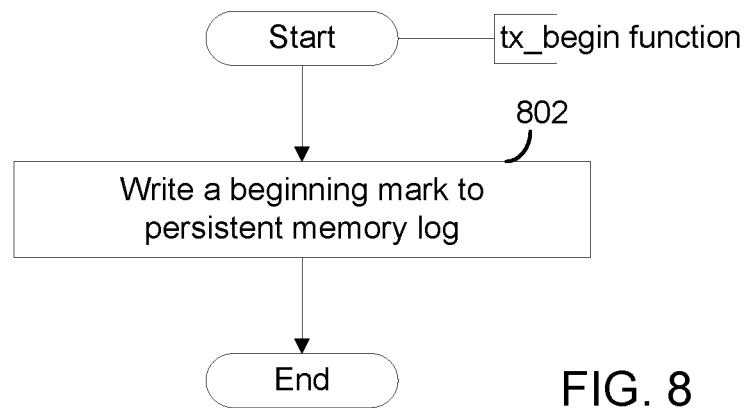
FIG. 8 depicts a flowchart of operations of the tx_begin function, in an embodiment.

FIG. 8 depicts a flowchart of operations performed by a tx_begin function for tracking and logging activity of an application, in an embodiment. Tx_begin function 312 receives a call from main function 306, and in step 802, writes a beginning mark 320 to persistent memory log 316, 318 for the transaction, where the beginning mark 320 indicates that the transaction is active, (i.e., ready to accept undo entries into the log). In some embodiments, the call includes a transaction id specifying one among several transactions to start. In an embodiment, tx begin function 312 is included in application-specific modules 218 in FPGA 112. In another embodiment, tx_begin function 312 is included in memory controller 230a, 230b.

Figure 9:
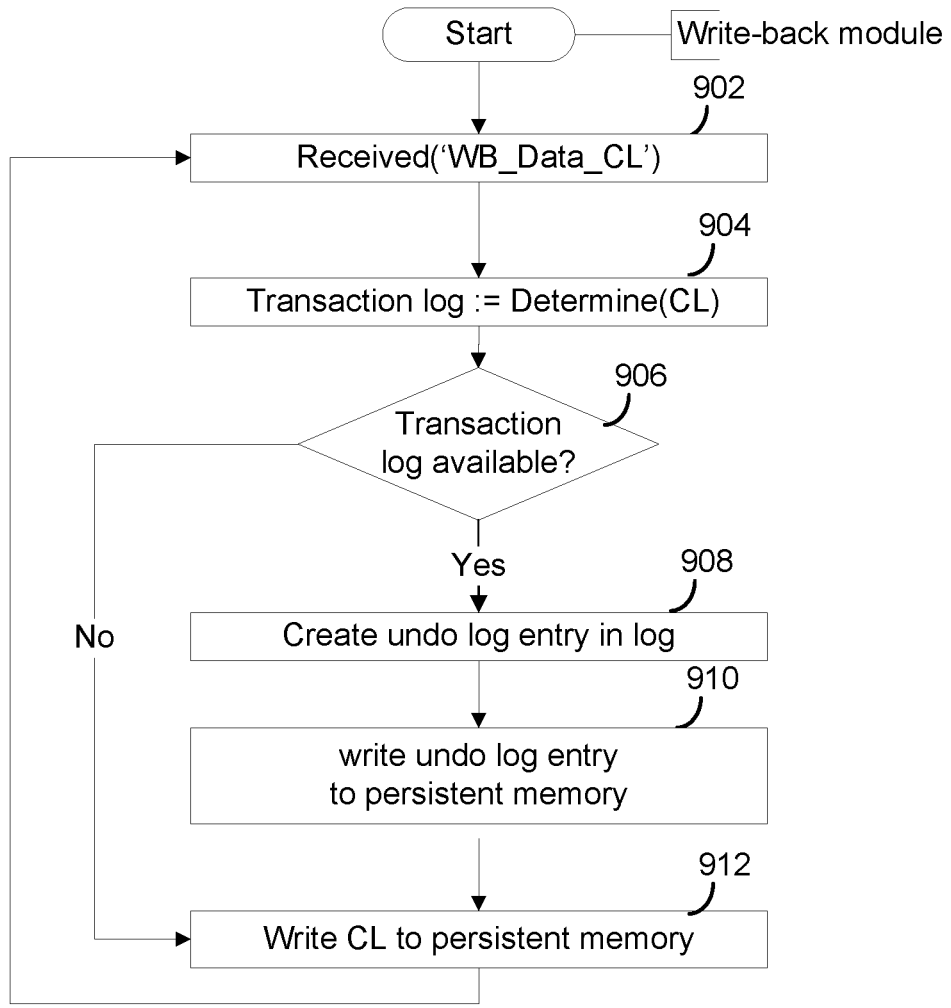
FIG. 9 depicts a flowchart of operations of the write-back module, in an embodiment.

FIG. 9 depicts a flowchart of operations performed by the write-back module for tracking and logging activity of an application, in an embodiment. In step 902, write-back module 314 receives a message, 'WB_Data_CL', indicating the occurrence of a write-back event on coherent interconnect 114. In step 904, write-back module 314 identifies one of the transaction logs 316, 318 as being the log corresponding to a cache line being written back in a write-back event on coherence interconnect 114. In one embodiment, write-back module 314 identifies the transaction log corresponding to the cache line by checking the physical addresses for which the transaction log was setup. Because conflicts among physical addresses are ruled out, only one transaction log is identified. After identifying the transaction log, as determined in step 906, write-back module 314 creates, in step 908, an undo log entry and in step 910 writes the undo entry to the identified transaction log in persistent memory 106b, 106d, 106f. In one embodiment, data in the undo log entry includes an old cache line value before the cache line write is performed, and a physical address. In step 912, write-back module 314 writes the cache line indicated by the message in step 902 to persistent memory 106b, 106d, 106f. In an embodiment, write-back module 314 is included in application-specific modules 218 in FPGA 112. In another embodiment, write-back module 314 is included in memory controller 230a, 230b.

Figure 10:
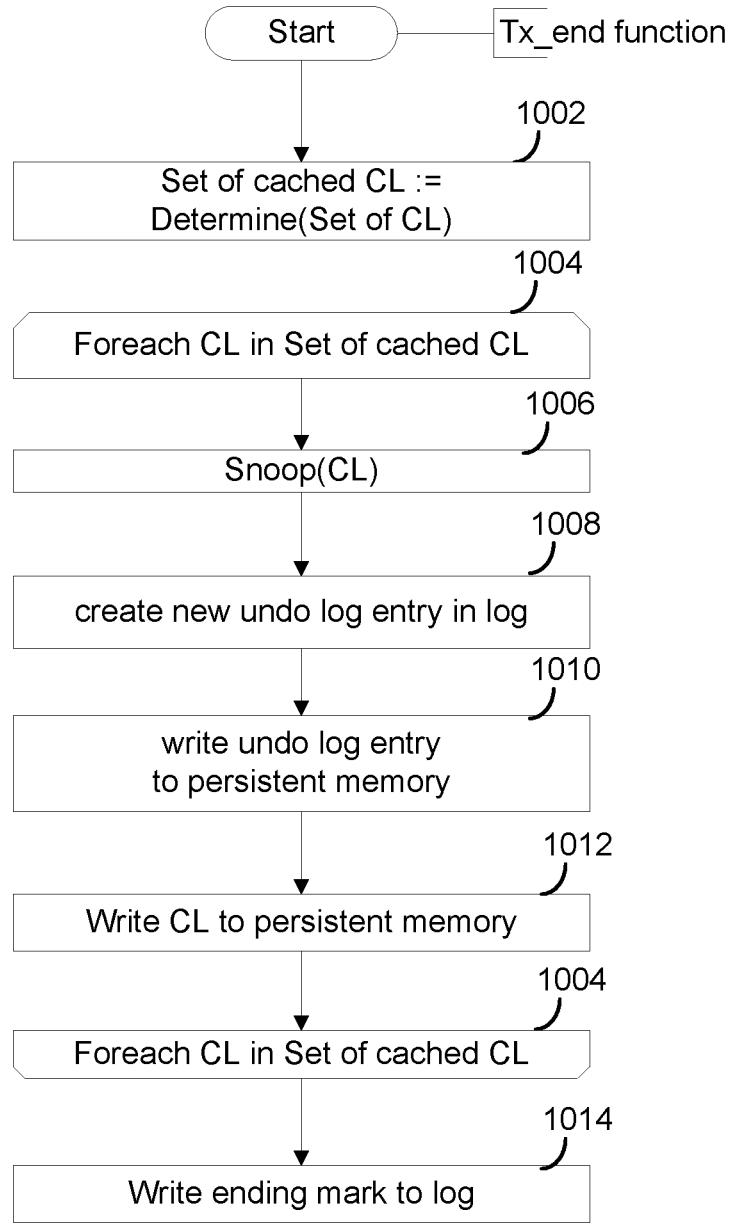
FIG. 10 depicts a flowchart of operations of the tx_end function, in an embodiment.

FIG. 10 depicts a flowchart of operations performed by the tx_end function for tracking and logging activity of an application, in an embodiment. In step 1002, tx_end function 310 determines a set of cache lines residing in the processors' caches using the set of cache lines derived from the memory range and queries on coherence interconnect 114. In step 1004, tx_end function 310 starts an iterator over the set of cache lines in the processors' caches for the transaction. For each cache line, tx_end function 310 snoops, via the cache protocol agent 220, the cache line in step 1006, using coherence interconnect 114. If the cache line is modified, the snoop of the cache line (snoop(CL)) forces the cache line (CL) out of caches 224. In step 1008, tx_end function 310 creates a new undo entry in the transaction log and in step 1010, writes the undo log entry to persistent memory 106b, 106d, 106f. In step 1012, tx_end function 310 writes the cache line (CL) to persistent memory 106b, 106d, 106f. After the iteration is completed, then in step 1014, tx_end function 310 writes an ending mark to the transaction log. The ending mark 326 closes out the transaction log for the transaction. In some embodiments, the call to the tx_end function includes a transaction id identifying one of the transactions among many concurrent transactions. In an embodiment, tx_end function 310 is included in application-specific modules 218 in FPGA 112. In another embodiment, tx end function 310 is included in memory controller 230a, 230b.

Figure 11:
FIG. 11 depicts timelines, in summary fashion, for the operations of functions and modules for performing the failure-atomic logging of changes by the application, in an embodiment.

FIG. 11 depicts timelines, in summary fashion, for the operations of functions and modules for performing the failure-atomic logging of changes by the application. At time t1, application 302 sends a 'register virtual memory region to OS/hypervisor 304. OS/hypervisor 304 converts the virtual memory region to a plurality of physical addresses and at t2 sends a request to setup the plurality of physical addresses to main function 306. Main function 306 then sends a message 'setup physical addresses' to setup function 308 which uses the physical addresses to compute a set of cache lines to be tracked. Setup function 308 then determines which cache lines of the set of cache lines are in processor's caches and snoops and writes back the dirty cache lines to persistent memory 106b, 106d, 106f. When setup function 308 is finished, setup function 308 sends a 'setup complete' message at time t3 to OS/hypervisor 304. At time t4, OS/hypervisor context switches back to application 302. At time t5, application 302 sends a 'tx_begin' message to main function 306 which invokes tx_begin function 312. Tx_begin function writes a beginning mark 320 to a transaction log. Between times t5 and t6, while application 302 executes, write-back module 314 detects write-back events on coherence interconnect 114 by receiving 'WB_Data_CL' messages and in response creates and adds an undo entry into the transaction log and then writes back the cache line for each message. At time t6, application 302 sends a 'tx_end' message to main function 306 which invokes tx_end function 310. Tx_end function 310 snoops any cache lines still in processors' caches, adds entries for each modified cache line to the undo log, writes the undo entries to persistent memory 106b, 106d, 106f, and writes cache lines for each modified cache line to persistent memory 106b, 106d, 106f. Tx_end function 310 then writes an ending mark 326 in the transaction log making the transaction inactive. In this manner, application 302 can convert changes it makes in a region of virtual memory into an atomic transaction, which then can be undone in the event of a failure by using each entry in the transaction log to roll back the recorded change according to the entry. The atomic transaction is under complete control of application 302 and requires no costly interventions by application 302 or delays of application 302. In addition, if the transaction log is stored persistent memory 106b, 106d, 106f, application 302 can recover from a power loss because a write to the undo log for the cache line is made to persistent memory 106b, 106d, 106f before the write to the cache line is made to persistent memory 106b, 106d, 106f.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer-readable medium refers to any data storage device that can store data which can thereafter be input to a computer system. Computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for logging changes to cache lines in a set of cache lines into a log for a transaction, the log permitting recovery from a failure, comprising:
   receiving a signal to begin logging changes to cache lines in the set of cache lines corresponding to a plurality of physical addresses, the plurality of physical addresses derived from a virtual memory region specified by an application, wherein the signal to begin the logging is received in response to the application sending a command to register the virtual memory region to be tracked for the transaction;
   in response to the signal to begin the logging, adding a beginning mark for the transaction to the log, wherein the log resides in a persistent memory and the beginning mark indicates that the transaction is active; and
   while the transaction is active:
      tracking each of the cache lines in the set of cache lines while the application is executing;
      receiving an indication that a cache line of the cache lines in the set of cache lines has been modified while the application is executing, the indication being a write-back event for the cache line;
      creating and adding an undo entry corresponding to the cache line to the log;
      receiving a signal to end the logging; and
      in response to the signal to end the logging, adding an ending mark for the transaction to the log, the ending mark indicating that the transaction is inactive.

2. The method of claim 1,
   further comprising receiving a transaction id, the transaction id identifying the log among a plurality of transaction logs;
   wherein the transaction id is included in the signal to begin the logging and the signal to end the logging.

3. The method of claim 1, wherein tracking each of the cache lines in the set of cache lines comprises performing a snoop operation for each cache line in the set of cache lines, the snoop operation causing a snoop event on a cache coherent interconnect.

4. The method of claim 1,
   wherein receiving the indication that the cache line has been modified includes receiving the write-back event for the cache line on a coherence interconnect; and
   wherein the write-back event occurs while the transaction is active.

5. The method of claim 1, further comprising:
   in response to receiving the signal to end the logging, snooping each of the cache lines in the set of cache lines; and
   in response to snooping each of the cache lines, determining that a second cache line is modified and creating and adding a second undo entry corresponding to the second cache line to the log for the transaction prior to adding the ending mark.

6. A non-transitory computer-readable medium containing instructions, which when executed by one or more processors, cause the one or more processors to carry out a method for logging changes to cache lines in a set of cache lines into a log for a transaction, the log permitting recovery from a failure, wherein the method comprises:
   receiving a signal to begin logging changes to cache lines in the set of cache lines corresponding to a plurality of physical addresses, the plurality of physical addresses derived from a virtual memory region specified by an application, wherein the signal to begin the logging is received in response to the application sending a command to register the virtual memory region to be tracked for the transaction;
   in response to the signal to begin the logging, adding a beginning mark for the transaction to the log, wherein the log resides in a persistent memory and the beginning mark indicates that the transaction is active; and
   while the transaction is active:
      tracking each of the cache lines in the set of cache lines while the application is executing;
      receiving an indication that a cache line of the cache lines in the set of cache lines has been modified while the application is executing, the indication being a write-back event for the cache line;
      creating and adding an undo entry corresponding to the cache line to the log;
      receiving a signal to end the logging; and
      in response to the signal to end the logging, adding an ending mark for the transaction in the log, the ending mark indicating that the transaction is inactive.

7. The non-transitory computer-readable medium of claim 6,
   wherein the method further comprises receiving a transaction id, the transaction id identifying the log among a plurality of transaction logs; and
   wherein the transaction id is included in the signal to begin the logging and the signal to end the logging.

8. The non-transitory computer-readable medium of claim 6, wherein tracking each of the cache lines in the set of cache lines comprises performing a snoop operation for each cache line in the set of cache lines, the snoop operation causing a snoop event on a cache coherent interconnect.

9. The non-transitory computer-readable medium of claim 6, wherein receiving the indication that the cache line has been modified includes receiving the write-back event for the cache line while the transaction is active, on a coherence interconnect.

10. The non-transitory computer-readable medium of claim 6, wherein the method further comprises:
  in response to receiving the signal to end the logging, snooping each of the cache lines in the set of cache lines; and
  in response to snooping each of the cache lines, determining that a second cache line is modified and creating and adding a second undo entry corresponding to the second cache line to the log for the transaction prior to adding the ending mark.

11. A computing system comprising:
  a plurality of CPUs, each having a cache;
  a coherence interconnect coupled to the caches;
  a persistent memory containing a log for a transaction; and
  a device coupled to the persistent memory and the coherence interconnect;
  wherein the device is configured to:
    receive a signal to begin logging changes to cache lines in a set of cache lines corresponding to a plurality of physical addresses, the plurality of physical addresses derived from a virtual memory region specified by an application, wherein the signal to begin the logging is received in response to the application sending a command to register the virtual memory region to be tracked for the transaction;
    in response to the signal to begin the logging, add a beginning mark for the transaction to the log;
    track each of the cache lines in the set of cache lines while the application is executing;
    receive an indication that a cache line of the cache lines in the set of cache lines has been modified while the application is executing, the indication being a write-back event for the cache line;
    create and add an undo entry corresponding to the cache line to the log; and
    add an ending mark for the transaction to the log.

12. The system of claim 11, wherein being configured to track each of the cache lines in the set of cache lines includes being configured to perform a snoop operation for each cache line in the set of cache lines on the coherency interconnect.

13. The system of claim 11, wherein the device is further configured to detect the write-back event relating to the cache line while the transaction is active, on the coherence interconnect, the write-back event providing the indication that the cache line has been modified.

14. The system of claim 11, wherein one or more CPUs of the plurality of CPUs run the application; and
wherein the application provides an ending signal to the device to cause the device to add the ending mark to the log.

* * * * *